United States Patent
Amaral et al.

(10) Patent No.: US 6,901,765 B2
(45) Date of Patent: Jun. 7, 2005

(54) TEMPERATURE REGULATION APPARATUS FOR A MOTOR VEHICLE, AND METHODS OF IMPLEMENTING THE APPARATUS

(75) Inventors: Manuel Amaral, Vitry-sur-Seine (FR); Thomas Gielda, Brighton, MI (US)

(73) Assignees: Peugeot Citroen Automobiles SA, Neuilly-sur-Seine (FR); Visteon Global Technologies, Inc., Dearborn, MI (US)

( * ) Notice: Subject to any disclaimer, the term of this patent is extended or adjusted under 35 U.S.C. 154(b) by 203 days.

(21) Appl. No.: 10/275,921

(22) PCT Filed: May 14, 2001

(86) PCT No.: PCT/FR01/01459

§ 371 (c)(1),
(2), (4) Date: Jan. 15, 2003

(87) PCT Pub. No.: WO01/87652

PCT Pub. Date: Nov. 22, 2001

(65) Prior Publication Data

US 2004/0035130 A1 Feb. 26, 2004

(30) Foreign Application Priority Data

May 15, 2000 (FR) ............................................. 00 06116

(51) Int. Cl.⁷ ................................................. B60H 1/32
(52) U.S. Cl. ........................................... 62/239; 62/434
(58) Field of Search ....................... 62/239, 244, 323.1, 62/434, 435

(56) References Cited

U.S. PATENT DOCUMENTS

| | | | |
|---|---|---|---|
| 2,893,218 A | 7/1959 | Harnish | |
| 5,265,437 A | 11/1993 | Saperstein et al. | |
| 5,537,956 A | 7/1996 | Rennfeld et al. | |
| 6,038,877 A | * | 3/2000 | Peiffer et al. ................. 62/244 |
| 6,457,324 B2 | * | 10/2002 | Zeigler et al. ................ 62/406 |
| 6,640,889 B1 | * | 11/2003 | Harte et al. .................. 165/202 |
| 6,662,864 B2 | 12/2003 | Burk et al. | |

FOREIGN PATENT DOCUMENTS

| | | |
|---|---|---|
| DE | 199 30 148 A1 | 1/2000 |
| EP | 0 595 714 A1 | 5/1994 |
| EP | 0 970 833 A1 | 1/2000 |
| FR | 2 697 210 A1 | 4/1994 |

* cited by examiner

Primary Examiner—William E. Tapolcai
(74) Attorney, Agent, or Firm—Oliff & Berridge, PLC

(57) ABSTRACT

The apparatus comprises a heat pump (12) having a main refrigerant circuit (14) taking heat from a cold source (16) and transferring it to a hot source (18), and a cooling circuit (48) for cooling an exothermal part, such as an engine, the cooling circuit being connected to a cooling heat exchanger (50). The cold source (16) has a first refrigerant/coolant heat exchanger (24) thermally coupling the main circuit to a first secondary coolant circuit (26) capable of being selectively connected to an "outside" heat exchanger (30), to a "cold" heat exchanger (32), and to the cooling heat exchanger (50). The hot source (18) has a second refrigerant/coolant heat exchanger (34) thermally coupling the main circuit (14) to a second secondary coolant circuit (36) capable of being selectively connected to the outside heat exchanger (30), to a "hot" heat exchanger (39), and to the cooling heat exchanger (50). The invention is applicable to air conditioning a vehicle cabin.

20 Claims, 3 Drawing Sheets

TEMPERATURE REGULATION APPARATUS FOR A MOTOR VEHICLE, AND METHODS OF IMPLEMENTING THE APPARATUS

The present invention relates to temperature regulation apparatus for a motor vehicle, and to methods of implementing the apparatus.

The invention applies in particular to air conditioning a vehicle cabin.

The state of the art, and in particular FR-2 697 210, discloses temperature regulation apparatus for a motor vehicle of the type comprising:

a heat pump comprising a main compression circuit for a refrigerant fluid taking heat from a cold source to transfer it to a hot source; and cooling means for cooling an exothermal part of the vehicle, the cooling means comprising a cooling circuit for a liquid coolant connected to a cooling heat exchanger;

the cold source or the hot source having a refrigerant/coolant heat exchanger thermally coupling the main refrigerant circuit to a secondary circuit for a liquid coolant, the secondary circuit being capable of being selectively connected to at least two heat exchangers.

The compression circuit generally comprises an evaporator in heat exchange with the cold source, and a condenser in heat exchange with the hot source, these elements being connected together by a compressor and an expander. The refrigerant vaporizes in the evaporator, thereby taking heat from the cold source. The compressor draws in the vaporized refrigerant and delivers it to the condenser which is cooled by heat exchange with the hot source, and in which the refrigerant condenses. The expander allows the refrigerant in the liquid state to pass to the evaporator by reducing its pressure.

The heat pump may be used either to heat a space or a part, or else to cool said space or said part.

In FR-2 697 210, the hot source comprises a first refrigerant/coolant heat exchanger thermally coupling the main refrigerant circuit to a first secondary coolant circuit, and the hot source comprises a second refrigerant/coolant heat exchanger thermally coupling the main refrigerant circuit to a second secondary coolant circuit. The secondary circuits are capable of being selectively connected via appropriate valves to an outside heat exchanger placed in the vehicle engine compartment, and to an inside heat exchanger placed inside the vehicle cabin. By acting on the valves, it is possible to use the heat pump either to cool the vehicle cabin, in this first case the heat source is the outside heat exchanger and the cold source is the inside heat exchanger, or else to heat the cabin, in this second case the hot source is the inside heat exchanger and the cold source is the outside heat exchanger.

It will be observed that in the second case, the performance of the heat pump is limited by the temperature of the outside air. In the cold season, the temperature of the outside air is not sufficient to obtain satisfactory efficiency for the heat pump when it is used for the purpose of heating the cabin. In addition, frosting of the cold source in the cold season can harm the operating performance of the heat pump.

Furthermore, the reversibility of the outside and inside heat exchangers (each used either as a hot source or as a cold source) leads essentially to the following two drawbacks:

1) the performance of each heat exchanger is limited by the fact that it cannot be optimized for specific operation of the heat exchanger either as a hot source or else as a cold source; and 2) it is difficult to control the humidity of the air in the vicinity of the inside heat exchanger.

The second drawback is particularly troublesome when air conditioning the vehicle cabin in mid-season. Under such circumstances, the inside heat exchanger is likely to alternate frequently between its cabin-refrigerating and cabin-heating modes of operation. Thus, in refrigerating mode, the inside heat exchanger picks up water. When it switches to heating mode, the water accumulated while in refrigerating mode is exhausted into the cabin by evaporation. FR-2 697 210 disposes mitigating that drawback by means of an auxiliary heat exchanger arranged in the vicinity of the inside heat exchanger. Nevertheless, that auxiliary heat exchanger is not functional under certain circumstances, and in particular for mid-seasons temperatures of around 15° C.

A particular object of the present invention is to optimize the performance of temperature regulation apparatus having a heat exchanger, in particular when it is used for heating or refrigerating a motor vehicle cabin or when it is used for regulating the temperature of a motor for propelling the vehicle.

To this end, the invention provides temperature regulation apparatus for a motor vehicle, the apparatus being of the above-cited type and being characterized in that the secondary circuit is capable of being selectively connected to the cooling heat exchanger, to an "outside" heat exchanger, and to a "hot" or "cold" heat exchanger.

Characteristics of various embodiments of the apparatus are as follows:

the cold source comprises a first refrigerant/coolant heat exchanger thermally coupling the main refrigerant circuit to a first secondary coolant circuit capable of being selectively connected to the cooling heat exchanger, to the outside heat exchanger, and to a "cold" heat exchanger; and the hot source comprises a second refrigerant/coolant heat exchanger thermally coupling the main refrigerant circuit to a second secondary coolant circuit capable of being selectively connected to the cooling heat exchanger, to the outside heat exchanger, and to a "hot" heat exchanger;

the first and second secondary circuits are capable of being connected to the cooling circuit via:

a first bypass valve of the three-port type comprising a first port connected to the outlets of the first and second refrigerant/coolant heat exchangers, a second port connected to the inlet of the outside heat exchanger, and a third port connected to a branch of the cooling circuit upstream from the cooling heat exchanger; and a second bypass valve of the three-port type comprising a first port connected to the inlets of the first and second refrigerant/coolant heat exchangers, a second port connected to a branch of the cooling circuit downstream from the cooling heat exchanger, and a third port connected to the outlet of the outside heat exchanger;

the first and second secondary circuits are suitable for being connected to the cooling circuit via:

a first bypass valve of the two-port type comprising a first port connected to a branch of the cooling circuit upstream from the cooling heat exchanger, and a second port connected to branches of the first and second secondary circuits upstream from the outside heat exchanger; and a second bypass valve of the two-port type comprising a first port connected to a branch of the cooling circuit downstream from the cooling heat exchanger, and a second port connected to branches of the first and second secondary circuits downstream from the outside heat exchanger;

the cooling heat exchanger is a coolant/air heat exchanger;

the coolant liquid of the cooling circuit is a mixture of water and antifreeze;

the outside heat exchanger and the cooling heat exchanger are interconnected so as to form a single module suitable for being preassembled prior to being mounted in the vehicle; and the exothermal part is a motor.

The invention also provides a method of implementing the apparatus as defined above, the method being characterized in that the coolant liquid of at least one of the secondary circuits is caused to circulate both through the outside heat exchanger and through the cooling heat exchanger.

The invention also provides a method of implementing the apparatus as defined above, the method being characterized in that the coolant liquid of the cooling circuit is caused to circulate both through the outside heat exchanger and the cooling heat exchanger.

The invention will be better understood on reading the following description given purely by way of example and made with reference to the accompanying drawings, in which:

FIGS. 1 to 3 show motor vehicle temperature regulation apparatus constituting a first embodiment of the invention, and given overall reference 10.

Figure 1:
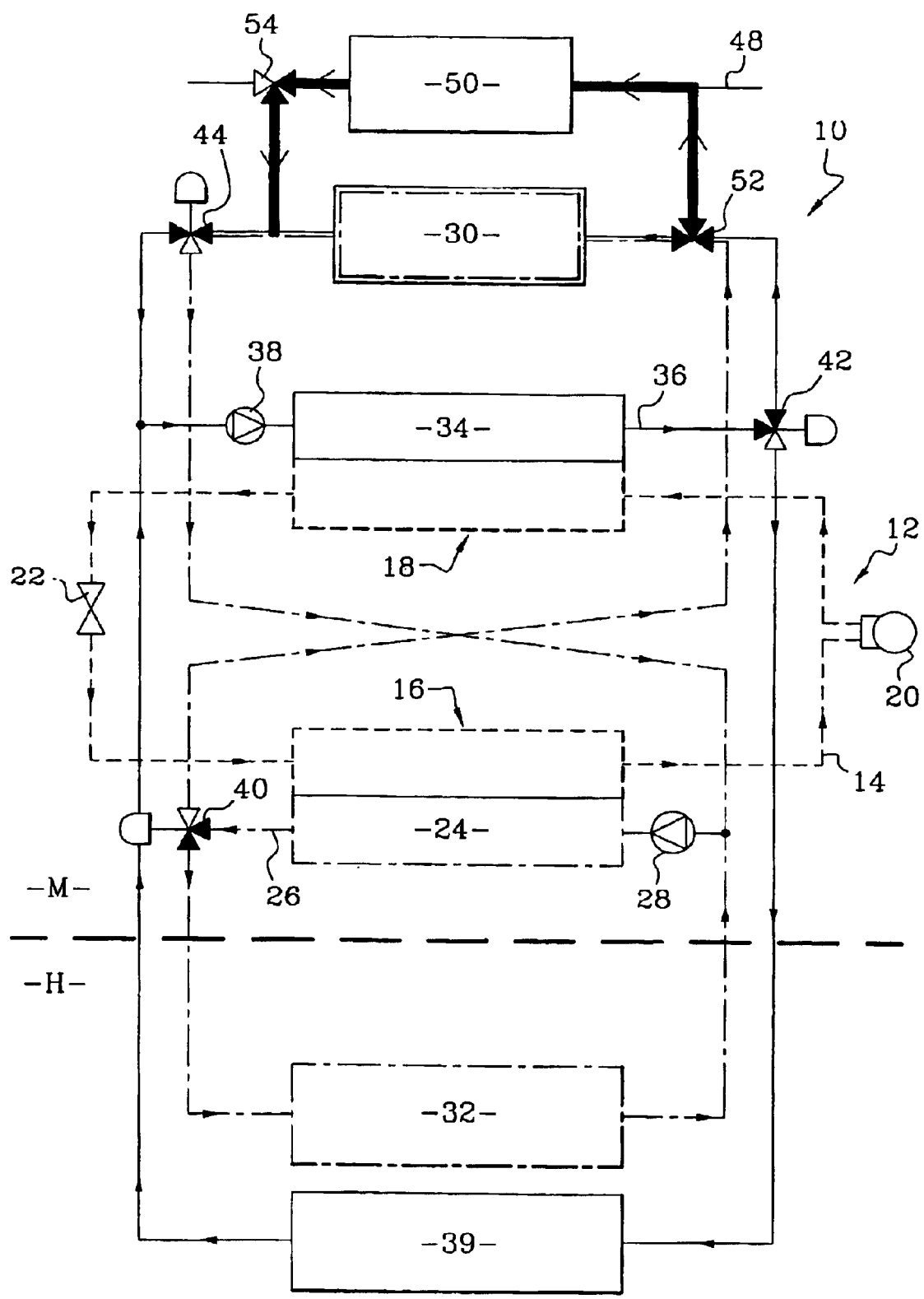
FIGS. 1 and 2 are diagrammatic views in respective first and second configurations of use of motor vehicle temperature regulation apparatus constituting a first embodiment of the invention.

In the description below, two parts are said to be thermally coupled together when they exchange heat between each other by means of a suitable heat exchanger.

The temperature regulation apparatus 10 comprises a heat pump 12 having a main refrigerant circuit 14 of the compression type taking heat from a cold source 16 and transferring at least some of it to a hot source 18.

The cold and hot sources 16 and 18 are connected together by a compressor 20 (electrically or mechanically driven) and an expander valve 22. The refrigerant vaporizes taking heat from the cold source 16 the compressor 20 draws in the vaporized refrigerant and delivers it to the hot source where it condenses and cools. The expander valve 22 allows the refrigerant to pass in liquid form towards the cold source 16 by lowering its pressure. The refrigerant circulates around the circuit 14 in the direction marked by arrows in FIG. 1.

The cold source 16 comprises a first refrigerant/coolant heat exchanger 24 thermally coupling the main refrigerant circuit 14 to a first secondary circuit 26 for liquid coolant. This circuit includes a pump 28 for circulating the liquid coolant, which pump is connected to the inlet of the first heat exchanger 24.

The first secondary circuit 26 is capable of being selectively connected to an "outside" heat exchanger 30 and to a "cold" heat exchanger 32.

Figure 2:
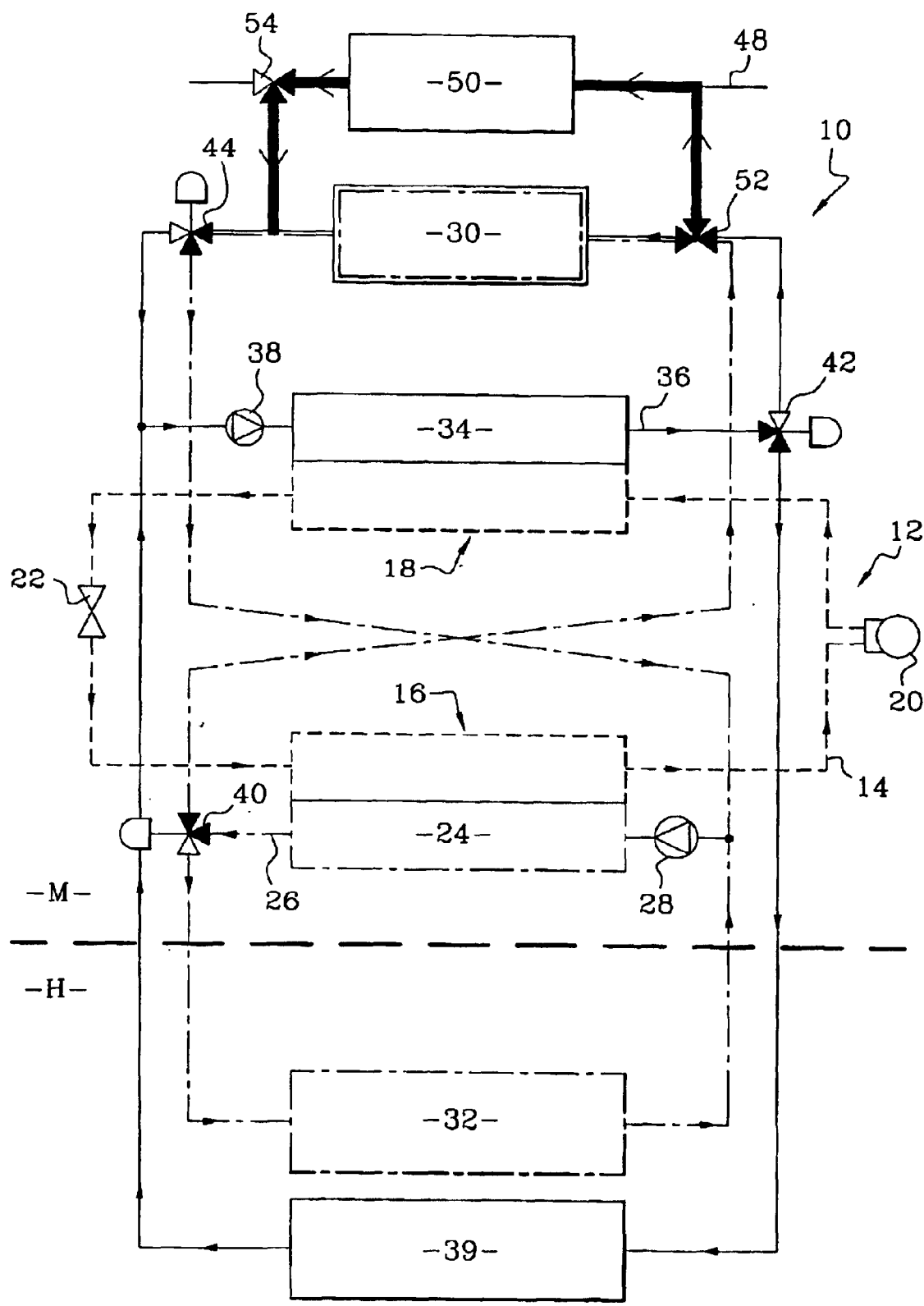
Figure 3:
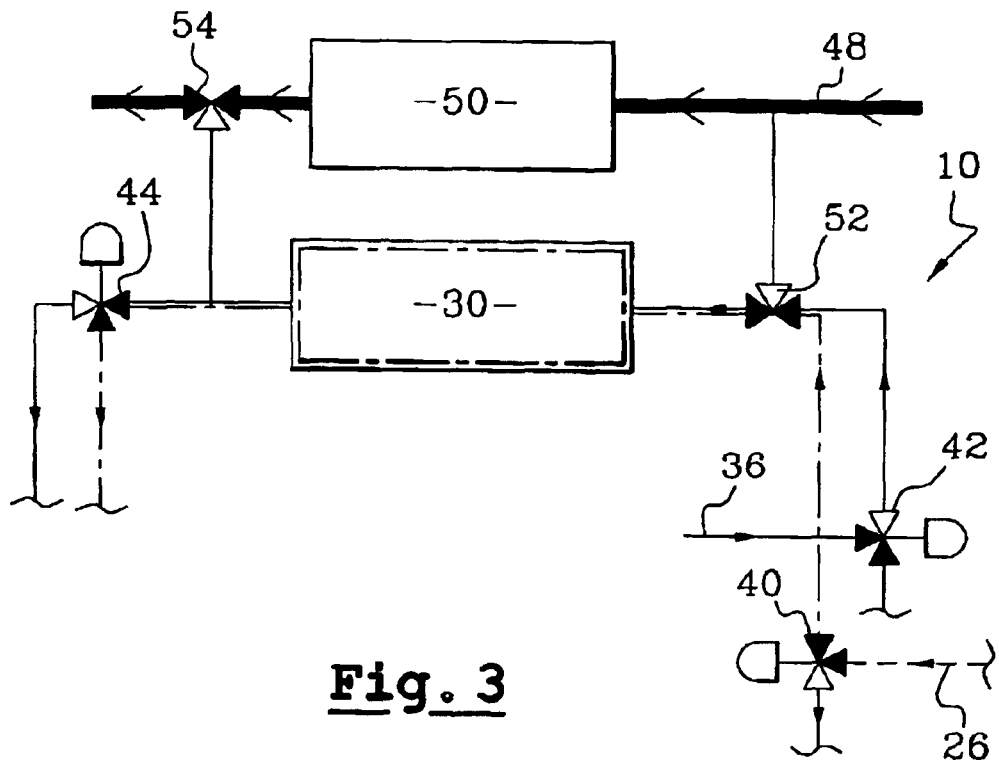
FIG. 3 is a fragmentary view of the temperature regulation apparatus shown in the preceding figures, showing the apparatus in a third configuration of use.

In the example shown in FIGS. 1 to 3, the outside heat exchanger 30 is a coolant/air heat exchanger placed in the engine compartment M of the vehicle, and the cold heat exchanger 32 is a coolant/air heat exchanger placed in the vehicle cabin H.

The hot source 18 has a second refrigerant/coolant heat exchanger 34 thermally coupling the main refrigerant circuit 14 to a second secondary circuit 36 for liquid coolant. This second secondary circuit comprises a pump 38 for circulating the liquid coolant, which pump is connected to the inlet of the second heat exchanger 34.

The second secondary circuit 36 is capable of being selectively connected to the outside heat exchanger 30 and to a "hot" heat exchanger 39.

In the example shown in FIGS. 1 to 3, the hot heat exchanger 39 is a coolant/air heat exchanger placed in the vehicle cabin H.

A conventional fan (not shown in the figures) serves to cause a flow of air to circulate through the cold and hot heat exchangers 32 and 39.

The heat pump 12 connected to the first and second heat exchangers 24 and 34 is located, for example, in the engine compartment of the vehicle.

The refrigerant circulating in the main circuit is of conventional type. This refrigerant is selected, for example, from chlorine and fluorine derivatives of methane and of ethane (Freon), hydrocarbons, ammonia, and carbon dioxide. The coolant liquid circulating in the first and second secondary circuits 26 and 36 is preferably a mixture of water and antifreeze (glycol).

The two secondary coolant circuits 26 and 36 are connected to the outside, cold, and hot heat exchangers 30, 32, and 39 respectively by means of a three-port valve 40 of the first secondary circuit, a three-port valve 42 of the second secondary circuit, and a three-port valve 44 common to both secondary circuits.

The three-port valve 40 of the first secondary circuit 26 is connected to the outlet of the first refrigerant/coolant heat exchanger 24 of the cold source, to the inlet of the outside heat exchanger 30, and to the inlet of the cold heat exchanger 32.

The valve 42 of the second secondary circuit 36 is connected to the outlet of the second refrigerant/coolant heat exchanger 34 of the hot source, to the inlet of the outside heat exchanger 30, and to the inlet of the hot heat exchanger 39.

The valve 44 common to the first and second secondary coolant circuits 26 and 36 is connected to the inlet of the first refrigerant/coolant heat exchanger 24 of the cold source, to the inlet of the second refrigerant/coolant heat exchanger 34 of the hot source, and to the outlet of the outside heat exchanger 30.

The valves 40 to 44 are controlled by conventional electrical, mechanical, thermomechanical, or pneumatic means.

The temperature regulation apparatus 10 also comprises means for cooling an exothermal part of the vehicle such as a motor for the vehicle as in the example described. This motor for propelling the vehicle is preferably of the heat engine type. Nevertheless, in a variant, the motor could be of some other type, in particular it could be an electric motor.

The engine cooling means comprise a cooling liquid circuit 48 connected to a cooling heat exchanger 50.

In the example shown in the figures, the cooling heat exchanger 50 is a coolant/air heat exchanger preferably located in the engine compartment M of the vehicle. A conventional fan (not shown in the figures) serves to cause a flow of air to pass through this cooling heat exchanger 50.

The coolant liquid circulating in the cooling circuit 48 is preferably a mixture of water and antifreeze (glycol).

The first and second secondary circuits 26 and 36 are designed to be connected in certain configurations of use of the apparatus 10 to the cooling heat exchanger 50.

For this purpose, in the first embodiment of the invention, the first and second secondary circuits 26 and 36 are capable of being connected to the cooling circuit via the following means.

A first bypass valve 52 of the three-port type has a first port connected to the outlets of the first and second refrigerant/coolant heat exchangers 24 and 34, a second port connected to the inlet of the outside heat exchanger 30, and a third port connected to a branch of the cooling circuit 48 upstream from the cooling heat exchanger 50.

A second bypass valve 54 of the three-port type has a first port connected to the inlets of the first and second refrigerant/coolant heat exchangers 24 and 34, a second port connected to a branch of the cooling circuit 48 downstream from the cooling heat exchanger 50, and a third port connected to the outlet of the outside heat exchanger 30.

The bypass valves 52 and 54 are controlled by conventional electrical, mechanical, thermomechanical, or pneumatic means.

FIG. 1 shows the configuration of the temperature regulation apparatus 10 in vehicle cabin refrigerating mode. In this case, the valves 40 to 44 are set so as to connect the first secondary coolant circuit 26 to the cold heat exchanger and the second secondary coolant circuit 36 to the outside heat exchanger 30.

At the same time, the bypass valves 52 and 54 are set so as to cause the coolant of the second secondary circuit 36 to circulate both through the outside heat exchanger 30 and through the cooling heat exchanger 50. This setting of the bypass valves 52 and 54 is preferably established while the cooling means that are generally under the control of a thermostat are deactivated, so that the flow of cooling liquid in the circuit 48 at that time is zero. It should be observed that the cooling means are deactivated while the vehicle engine is relatively cold, particularly during a longer or shorter period following starting of the engine.

The coolant of the first secondary circuit 26 takes heat from the cabin via the cold heat exchanger 32, and delivers it to the vaporized refrigerant via the first refrigerant/coolant heat exchanger 24.

The coolant of the second secondary circuit 36 takes heat from the condensed refrigerant via the second refrigerant/coolant heat exchanger 34 and delivers it to the outside of the vehicle via the outside heat exchanger 30 and the cooling heat exchanger 50.

The cooling heat exchanger 50 adds to the heat exchange area of the outside heat exchanger 30 so the operation of the heat pump is optimized by heat being exhausted more efficiently from the hot source 18 by the coolant circulating in the second secondary circuit 36 and through these heat exchangers 30 and 50.

FIG. 2 shows the apparatus 10 in a cabin heating configuration. In this configuration, the valves 40 to 44 are set in such a manner as to connect the first secondary coolant circuit 26 to the outside heat exchanger 30 and the second secondary coolant circuit 36 to the hot heat exchanger 39.

Furthermore, the bypass valves 52 and 54 are set in a manner analogous to that shown in FIG. 1 to cause the coolant of the first secondary circuit 26 to flow both through the outside heat exchanger 30 and through the cooling heat exchanger 50. This setting of the bypass valves 52 and 54 is preferably established while the cooling means are deactivated, so that, at that time, the flow rate of cooling liquid through the circuit 48 is zero.

The coolant of the first secondary circuit 26 takes heat from outside the vehicle via the outside heat exchanger 30 and the cooling heat exchanger 50, and delivers it to the vaporized refrigerant via the first refrigerant/coolant heat exchanger 24.

The coolant of the second secondary circuit 36 takes heat from the condensed refrigerant via the second refrigerant/coolant heat exchanger 34 and delivers it to the cabin via the hot heat exchanger 39.

Since the cooling heat exchanger 50 adds to the heat exchange area of the outside heat exchanger 30, the operation of the heat pump is optimized by the coolant circulating in the first secondary circuit 26 and through both heat exchangers 30 and 50, thereby taking heat more efficiently from the outside air. Thus, the risks of the outside heat exchanger 30 frosting in the cold season are reduced.

Naturally, the valves 40 to 44 can be set to occupy configurations that are intermediate relative to the cabin-cooling and cabin-heating configurations shown in FIGS. 1 and 2, for example in order to accelerate cabin heating while contributing to controlling the relative humidity therein.

FIG. 3 shows the apparatus 10 in a cabin configuration where the valves 40 to 44 are set in a manner similar to FIG. 2 (cabin heating). Nevertheless, in this configuration, the engine cooling means are active: the cooling liquid is circulating in the cooling circuit 48. As a result, the bypass valves 52 and 54 are set so as to isolate the secondary circuit 26 and the outside heat exchanger 30 from the cooling circuit 48 and the cooling heat exchanger 50.

In a configuration that is not shown, the valves 40 to 44 can be set in a manner similar to FIG. 1 (cabin cooling) and the bypass valves 52 and 54 in a manner similar to FIG. 3. This configuration in which the secondary circuit 26 and the outside heat exchanger 30 are isolated from the cooling circuit 48 and the cooling heat exchanger 50 is established while the engine cooling means are activated.

Figure 4:
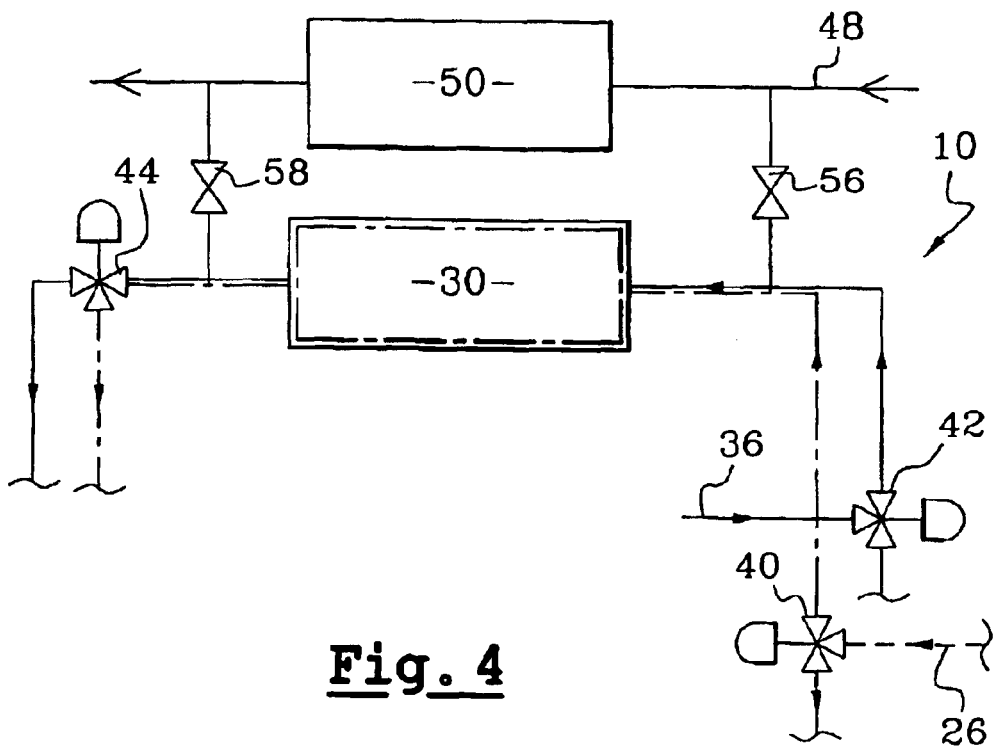
FIG. 4 is a view similar to FIG. 3 showing motor vehicle temperature regulation apparatus in a second embodiment of the invention.

FIG. 4 shows temperature regulation apparatus in a second embodiment of the invention. In this figure, elements analogous to those of the preceding figures, are designated by identical references.

In this embodiment, the first and second secondary circuits 26 and 36 are capable of being connected to the cooling circuit 48 via the following means.

A first bypass valve 56 of the two-port type has a first port connected to a branch of the cooling circuit 48, upstream from the cooling heat exchanger 50, and a second port connected to branches of the first and second secondary circuits 26 and 36 upstream from the outside heat exchanger 30.

A second bypass valve 58 of the two-port type has a first port connected to a branch of the cooling circuit 48 downstream from the cooling heat exchanger 50, and a second port connected to branches of the first and second secondary circuits 26 and 36 downstream from the outside heat exchanger 30.

The bypass valves 56 and 58 are controlled by conventional electrical, mechanical, thermomechanical, or pneumatic means.

The bypass valves 56 and 58 may be set out as to obtain connection (or isolation) configurations for the secondary circuits 26 and 36 and the cooling circuit 48 relative to one another that are analogous to the configurations shown in FIGS. 1 to 3.

Nevertheless, in this second embodiment of the invention, the bypass valves 56 and 58 may also be set so as to cause the coolant of the cooling circuit 48 to flow both through the outside heat exchanger 30 and through the cooling heat exchanger 50. This setting is advantageous when it is desired to provide effective cooling of an engine that is being subjected to exceptional overheating, because in this configuration the outside heat exchanger 30 adds to the heat exchange area of the cooling heat exchanger 50.

It may be observed that the outside and cooling heat exchangers 30 and 50 may be arranged in the engine compartment in various ways. In particular, these two heat exchangers 30 and 50 can be arranged either one behind the other (in a stacked configuration) so that their projections onto a plane substantially perpendicular to the direction of the flow of air passing through them overlaps at least in part, or else they can be arranged one beside the other (mosaic configuration) so that their projections onto a plane substantially perpendicular to the flow direction of the air passing through them do not overlap.

Furthermore, the outside and cooling heat exchangers 30 and 50 may be interconnected by the bypass valves so as to form a single module that can be preassembled prior to being mounted in the engine compartment.

The invention is not limited to the embodiments described above. In particular, in the first embodiment shown in FIGS. 1 to 3, it is possible to provide bypass valves 52, 54 suitable for being set so as to cause the coolant of the cooling circuit 48 to flow both through the outside heat exchanger 30 and through the cooling heat exchanger 50.

What is claimed is:

1. A motor vehicle temperature regulation apparatus, comprising:
   a heat pump comprising a main compression circuit for a refrigerant taking heat from a cold source to transfer it to a hot source; and
   a cooling system for cooling an exothermal part of the vehicle, the cooling system comprising a cooling circuit for a liquid coolant connected to a cooling heat exchanger;
   the cold source or the hot source having a refrigerant/coolant heat exchanger thermally coupling the main compression circuit to a secondary circuit for a liquid coolant, the secondary circuit selectively connected to at least two heat exchangers;
   wherein the secondary circuit is selectively connected to the cooling heat exchanger, to an outside heat exchanger, and to a hot or cold heat exchanger.

2. The apparatus according to claim 1, wherein:
   the cold source comprises a first refrigerant/coolant heat exchanger thermally coupling the main compression circuit to a first secondary coolant circuit selectively connected to the cooling heat exchanger, to the outside heat exchanger, and to the cold heat exchanger; and
   the hot source comprises a second refrigerant/coolant heat exchanger thermally coupling the main compression circuit to a second secondary coolant circuit selectively connected to the cooling heat exchanger, to the outside heat exchanger, and to the hot heat exchanger.

3. The apparatus according to claim 2, wherein the first and second secondary circuits are connected to the cooling circuit via:
   a first bypass valve of a three-port type comprising a first port connected to the outlets of the first and second refrigerant/coolant heat exchangers, a second port connected to the inlet of the outside heat exchanger, and a third port connected to a branch of the cooling circuit upstream from the cooling heat exchanger; and
   a second bypass valve of the three-port type comprising a first port connected to the inlets of the first and second refrigerant/coolant heat exchangers, a second port connected to a branch of the cooling circuit downstream from the cooling heat exchanger, and a third port connected to the outlet of the outside heat exchanger.

4. The apparatus according to claim 2, wherein the first and second secondary circuits are connected to the cooling circuit via:
   a first bypass valve of a two-port type comprising a first port connected to a branch of the cooling circuit upstream from the cooling heat exchanger, and a second port connected to branches of the first and second secondary circuits upstream from the outside heat exchanger; and
   a second bypass valve of the two-port type comprising a first port connected to a branch of the cooling circuit downstream from the cooling heat exchanger, and a second port connected to branches of the first and second secondary circuits downstream from the outside heat exchanger.

5. The apparatus according to claim 1, wherein the cooling heat exchanger is a coolant/air heat exchanger.

6. The apparatus according to claim 1, wherein the liquid coolant of the cooling circuit is a mixture of water and antifreeze.

7. The apparatus according to claim 1, wherein the outside heat exchanger and the cooling heat exchanger are interconnected to form a single module suitable for being preassembled prior to being mounted in the vehicle.

8. The apparatus according to claim 1, wherein the exothermal part of the vehicle is a motor.

9. A method of implementing the apparatus according to claim 1, comprising causing the liquid coolant of at least one of the secondary circuits to circulate through the outside heat exchanger and through the cooling heat exchanger.

10. A method of implementing the apparatus according to claim 4, comprising causing the liquid coolant of the cooling circuit to circulate through the outside heat exchanger and the cooling heat exchanger.

11. A motor vehicle temperature regulation apparatus, comprising:
    a heat pump comprising a main compression circuit for a refrigerant fluid taking heat from a cold source to transfer it to a hot source; and
    cooling means for cooling an exothermal part of the vehicle, the cooling means comprising a cooling circuit for liquid coolant connected to a cooling heat exchanger;
    wherein the cold source or the hot source has a refrigerant/coolant heat exchanger thermally coupling the main compression circuit to a secondary circuit for a liquid coolant; and
    means for allowing the secondary circuit to be connected selectively to each of three heat exchangers chosen among the cooling heat exchanger, an outside heat exchanger, a hot heat exchanger and a cold heat exchanger.

12. The apparatus according to claim 11, wherein:
    the cold source comprises a first refrigerant/coolant heat exchanger thermally coupling the main compression circuit to a first secondary coolant circuit;
    the hot source comprises a second refrigerant/coolant heat exchanger thermally coupling the main compression circuit to a second secondary coolant circuit;
    first connecting means for allowing the first secondary coolant circuit to be connected selectively to each of the cooling heat exchanger, the outside heat exchanger and the cold heat exchanger; and second connecting means for allowing the second secondary coolant circuit to be connected selectively to each of the cooling heat exchanger, the outside heat exchanger and the cold heat exchanger.

13. The apparatus according to claim 12 further comprising, connecting means for allowing the first and second secondary circuits to be connected to the cooling circuit, the connecting means comprising:
    a first bypass valve of a three-port type comprising a first port connected to the outlets of the first and second refrigerant/coolant heat exchangers, a second port connected to the inlet of the outside heat exchanger, and a third port connected to a branch of the cooling circuit upstream from the cooling heat exchanger; and
    a second bypass valve of the three-port type comprising a first port connected to the inlets of the first and second refrigerant/coolant heat exchangers, a second port connected to a branch of the cooling circuit downstream from the cooling heat exchanger, and a third port connected to the outlet of the outside heat exchanger.

14. The apparatus according to claim 12 further comprising, connecting means for allowing the first and second secondary circuits to be connected to the cooling circuit, the connecting means comprising:
    a first bypass valve of a two-port type comprising a first port connected to a branch of the cooling circuit upstream from the cooling heat exchanger, and a second port connected to branches of the first and second secondary circuits upstream from the outside heat exchanger; and
    a second bypass valve of the two-port type comprising a first port connected to a branch of the cooling circuit downstream from the cooling heat exchanger, and a second port connected to branches of the first and second secondary circuits downstream from the outside heat exchanger.

15. The apparatus according to claim 11, wherein the cooling heat exchanger is a coolant/air heat exchanger.

16. The apparatus according to claim 11, wherein the coolant liquid of the cooling circuit is a mixture of water and antifreeze.

17. The apparatus according to claim 11, wherein the outside heat exchanger and the cooling heat exchanger are interconnected to form a single module suitable for being preassembled prior to being mounted in the vehicle.

18. The apparatus according to claim 11, wherein the exothermal part of the vehicle is a motor.

19. A method of implementing the apparatus according to claim 14, comprising causing the coolant liquid of at least one of the secondary circuits to circulate through the outside heat exchanger and through the cooling heat exchanger.

20. A method of implementing the apparatus according to claim 14, comprising causing the coolant liquid of the cooling circuit to circulate through the outside heat exchanger and the cooling heat exchanger.

* * * * *

UNITED STATES PATENT AND TRADEMARK OFFICE
CERTIFICATE OF CORRECTION

PATENT NO. : 6,901,765 B2
DATED : June 7, 2005
INVENTOR(S) : Manuel Amaral and Thomas Gielda It is certified that error appears in the above-identified patent and that said Letters Patent is hereby corrected as shown below:

Title page,
Item [30], Foreign Application Priority Data, insert:
-- November 28, 2000   (FR)..........................00 15365 --.

Signed and Sealed this

Twenty-seventh Day of December, 2005

JON W. DUDAS
*Director of the United States Patent and Trademark Office*